United States Patent [19] [11] 3,681,982
Hiratsuka et al. [45] Aug. 8, 1972

[54] TRANSDUCER SYSTEM FOR DETECTING AND MEASURING MECHANICAL LOADS OR STRESSES

[72] Inventors: Michio Hiratsuka; Jiro Ishii, both of Irima-shi; Tadahiko Goto; Atsuo Takeda, both of Kitakyushu, all of Japan

[73] Assignee: Kabushiki Kaisha Yaskawa Denki Seisakusho, Kitakyushu-shi, Japan

[22] Filed: June 15, 1971

[21] Appl. No.: 153,411

Related U.S. Application Data

[63] Continuation of Ser. No. 848,171, Aug. 7, 1969, abandoned.

[30] Foreign Application Priority Data

Sept. 8, 1968 Japan..................43/56927
Sept. 26, 1968 Japan..................43/70347

[52] U.S. Cl..............................................73/141 A
[51] Int. Cl...............................................G01s 1/12
[58] Field of Search ...324/34 MA, 34 ST; 73/88.5 R, 73/141 A, DIG. 2

[56] References Cited

UNITED STATES PATENTS

| | | | |
|---|---|---|---|
| 1,666,680 | 4/1928 | Buckley | 73/141 A |
| 2,053,560 | 9/1936 | Janovsky | 324/34 ST |
| 2,370,845 | 3/1945 | Davis | 324/34 ST |
| 2,571,718 | 10/1951 | Howes | 73/141 A |
| 3,007,063 | 10/1961 | Harris | 310/26 |
| 3,224,101 | 12/1965 | Ohlsson | 73/88.5 R X |
| 3,279,247 | 10/1966 | Hiratsuka | 73/141 A |
| 3,440,871 | 4/1969 | Vissnia | 73/141 A |

FOREIGN PATENTS OR APPLICATIONS 442,441  2/1936  Great Britain .........324/34 ST

*Primary Examiner*—Charles A. Ruehl
*Attorney*—Ward, McElhannon & Fitzpatrick

[57] ABSTRACT

An apparatus and a transducer system for detecting and measuring mechanical stress applied on the transducer composed of at least one magnetic core of laminated silicon steel sheet construction, a plurality of coils wound on the magnetic core, a constant voltage a.c. source connected to these coils, pick-up means for picking up any variation caused in the current flowing through the coils due to the application of a load or stress on the magnetic core, a rectifying means for rectifying the thus picked-up variation in the current, a compensating means for compensating the zero point of the response characteristic of the transducer, a prestress applying means for improving the linearity of the response curve of the characteristics, whereby the magnitude of the load applied on the magnetic core is determined from the reading on a voltmeter or ammeter also included in the transducer system.

8 Claims, 18 Drawing Figures

3,681,982

3,681,982

TRANSDUCER SYSTEM FOR DETECTING AND MEASURING MECHANICAL LOADS OR STRESSES

This is a continuation of Ser. No. 848,171, filed Aug. 7, 1969, now abandoned.

BACKGROUND OF THE INVENTION

This invention relates to apparatuses and transducer systems for detecting and measuring mechanical loads or stresses, and more particularly to various types of transducer systems constituting improved applications of U.S. Pat. No. 3,279,247 granted to Michio Hiratsuka et al in October 1966.

Although the transducer system invented by us and patented as described above is of an excellent nature, it is rather fundamental and has various features which are still unsatisfactory in practical applications.

SUMMARY OF THE INVENTION

Therefore, the primary object of the present invention is to provide an improved construction of the apparatus and the transducer system of the character described which is simple in organization and can be easily operated.

Another object of the invention is to provide an improved organization of the transducer system wherein undesirable deviation at the zero point and malfunctioning effect of the temperature are automatically compensated for.

Still another object of the invention is to provide a novel organization of the transducer system wherein the linear portion of the output characteristic is extended approximately 10 times longer than that in the conventional transducer system.

These and other objects of the present invention can be achieved by a novel organization of the transducer system which comprises at least one magnetic core of laminated silicon steel sheets, a plurality of coils wound on the magnetic core, a constant-voltage a.c. source connected to these coils, means for picking up variation caused in the current flowing through the coils by the application of a load on the magnetic core, means for rectifying the thus picked-up variation in the current, a resistor connected across the d.c. output terminals of the rectifying means, a zero-adjustment power source for creating an adjustment voltage on another resistor, a voltmeter for comparing the voltage across the first resistor with the zero-adjustment voltage across the second resistor, and means for applying a prestress on the magnetic core, whereby the load applied on magnetic core is read on the voltmeter. Likewise the above described objects can be achieved by various embodiments of the present invention which will be described hereinafter.

The nature, principle, and utility of the invention will be more readily apparent from the following detailed description with respect to preferred embodiments of the invention when read in conjunction with the accompanying drawings, in which like parts are designated by like reference numerals.

DETAILED DESCRIPTION

Figure 1:
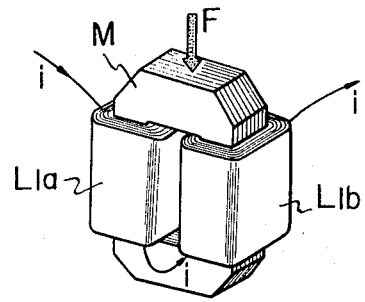
FIG. 1 is a perspective view of one example of a transducer element according to the present invention.

As described before, the invention relates to an improvement in a transducer system wherein a quantity corresponding to a mechanical load is transformed into an electric quantity by utilizing an electromagnetic phenomenon which is exactly opposite to the magnetostriction phenomenon. Accordingly, a full understanding of the true and physical meaning of such a phenomenon on which the present invention is based is highly important. More specifically, a full understanding of the nature of a magnetic substance employed for the transducer, that is, the manner of variation of magnetic characteristic of said substance with respect to the variation of the applied stresses, the physical coefficients which influence the magnetic characteristics thereof, and the extent of this influence, is conductive to an appreciative evaluation of the present invention, wherein various organizations of electromagnetic circuits or systems are proposed for the improvement of the electromagnetic transducer.

In the various examples of the transducers according to the present invention which are described hereinafter, the laminated magnetic cores each forming a magnetic path for the transducer are assumed to be of a ferromagnetic substance having minimum amount of anisotropy caused by the crystalline lattice structure of the component atoms, thereby possessing a variable internal magnetization directions, and also having a large magnetostriction coefficient $\lambda$. In addition, such a ferrous substance of least anisotropic nature is simulated by an isotropic ferromagnetic substance wherein the spontaneous elongation of a magnetic field is independent of the direction of the spontaneous magnetization in the crystal of the substance.

Assuming that the magnitude of the magnetization vector is represented by Ms at the time a compressive stress δ and a magnetic field H are applied to the magnetic substance in an identical direction, the magnitude of the magnetization M in the magnetizing direction may be obtained as follows from a condition wherein the sum of the magnetostatic energy under a magnetic field H and the magnetodynamic energy under the application of a mechanical stress becomes minimum.

$$M = (Ms^2 / 3.\sigma.\sigma)H \quad (1)$$

In a magnetic reactor employing a magnetic core made of such a magnetic substance, if it is supposed that an a.c. voltage V is applied across the terminals of a coil wound on the reactor, and an a.c. current $i$ flows through the coil, a variation of the current $i$ corresponding to the variation of the mechanical stress under the assumption that the terminal voltage V is maintained constant may be expressed by the following equation since the a.c. current $i$ is also proportional to the magnetic field H.

$$i \alpha \; H = (3.M.\lambda/M_x) \quad (2)$$

From this relation, it is apparent that a linear relation is maintained between the stress and the current $i$ (detected value). When the above formula is rewritten by employing a practical system of units, the following equation is obtained.

$$i = 2.96 \times 10^{12} \quad \sigma. L. V. W / (Ms^2.f. N^2. A_2) \quad (3)$$

wherein, the magnetic core is assumed to be a 3 percent silicon steel, and $\lambda = 7.4 \times 10^{-6}$ L = Effective length of the magnetic path in cm V = Volt W = Applied load in kg.

Ms = 1,620 gausses.

$f$ = Frequency in cycles per sec.

N = Number of turns of the coil.

A = Sectional area in cm² of the magnetic core at the portion where the load is applied.

From the formula (2), it is apparent that the relation between the stress and the current $i$ is rectilinear, and for this reason, a transducer of linear characteristic can be obtained. However, since the magnetic permeability in a practical magnetic core is of a limited value, a curved part appears at a comparatively small range near the zero point of the mechanical stress, and such a disadvantageous feature must be eliminated beforehand by applying an appropriate prestress on the magnetic core.

It has also been found that, unless the impedances of the a.c. power source and of the circuit for measuring the current $i$ are determined to sufficiently small values, the variation of the current $i$ is somewhat restricted in a region where the value of the mechanical stress is large, and the linear relation between the input and the output of the transducer is thereby impaired. For this reason, the impedance of the coil at the time the maximum stress is applied should be selected at a value about five times larger than the impedances of other related components in the circuit.

Furthermore, when the a.c. voltage applied to the coil is low, the a.c. magnetic flux induced thereby is of low magnitude, thus being easily influenced by the residual magnetization caused by the stresses which have been applied beforehand on the magnetic core, and showing a hysteresis effect in the characteristics of the transducer. On the contrary, when the a.c. voltage applied to the coil is high, the magnetic flux thereby induced is increased to a higher value near the saturated state, thus lowering the permeability of the magnetic core even in the case of no mechanical stress application. In this way, the variation ratio of the current $i$ corresponding to the mechanical stress becomes low, and a considerably high prestress becomes necessary for obtaining a required value of the current $i$.

Furthermore, the above described anisotropic feature of the magnetic core material causes a considerably disadvantageous effect on the characteristics of the transducer, and in some cases, the transducer is thereby rendered inoperable. For this reason, if it is desired to obtain a transducer of a precisely linear characteristic, the voltage applied to the coil must be determined so that the magnetic permeability of the core substance becomes the maximum, that is, the core must be magnetized to a degree near the maximum deflecting point (at approximately from 40 to 80 percent of the saturated magnetization value) of the B-H magnetizing curve. Thus, it is required that the transducer according to the present invention be so constructed that all of the above described design features are thereby satisfied.

Referring now to FIG. 1 showing a perspective view of a principal component of the transducer, the principal component comprises a magnetic core M of laminated construction having no air gap and having two coils L1a and L1b connected in series. The magnetic core M is adapted to receive beforehand a prestress applied thereon. On the magnetic core M, an outside force F is applied which, together with the previously applied prestress, causes an internal stress within the magnetic core, and a current $i$ is caused to flow through the coils L1a and L1b by the application of an outside voltage (not shown).

Figure 2:
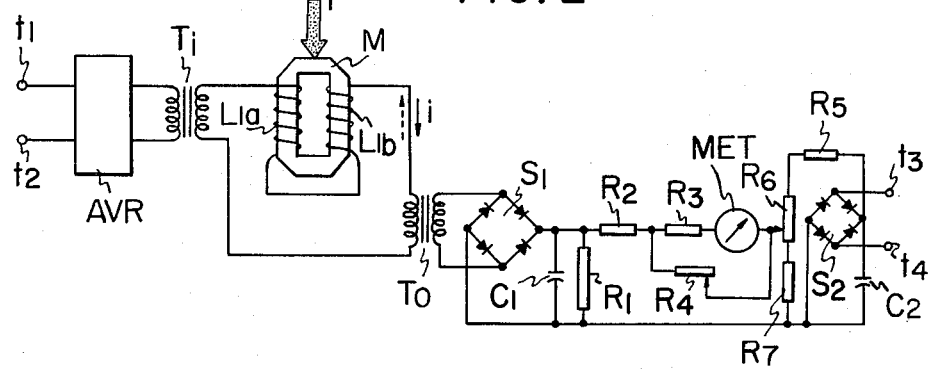
FIG. 2 is a connection diagram of a transducer system according to one embodiment of the invention.

FIG. 2 is an electrical circuit of the transducer system which constitutes a first embodiment of the present invention. The circuit includes an input transformer T$i$ and an output transformer T$o$ which are connected with the coils L1a and L1b of the transducer element. An a.c. voltage is applied from input terminals $t1$, $t2$ of a voltage stabilizing circuit AVR which is disposed at the preceding stage of the input transformer T$i$. The output side of the output transformer T$o$ is connected to a rectifying circuit S1 consisting of a bridge of silicon diodes, and the output of the rectifying bridge S1 is connected to a network consisting of a capacitor C1 and resistors R1, R2, R3, and R4. On the other hand, another rectifying circuit S2 consisting of a bridge of silicon diodes has input terminals $t3$ and $t4$ across which another a.c. voltage is applied, and the thus rectified voltage is supplied through resistors R5, R6, and R7 to a voltmeter MET which is in itself a comparator indicating the voltage difference between two voltages. A capacitor C2 is a smoothing capacitor connected across the output terminals of the rectifying circuit S2.

In this arrangement, the equivalent impedance as considered rearward from the primary side of the output transformer T$o$ is caused to be lower than one fifth of the impedance of the series connected coils L1a, L1b at the time a rated stress is applied to the magnetic core M.

When a load F is applied on the magnetic core M, the magnetic permeability of the core M varies, thus varying the inductances of the coils L1a, L1b according to the variation of the load, whereby the current flowing through the coils L1a, L1b is varied. It should be noted that the voltage applied across the input terminals of these coils must be maintained at a constant value. Then, the current $i$, varying in accordance with the magnitude of the applied force F, is detected through the output transformer T$o$, rectified into a d.c. current through the rectifier circuit S1, and led to the comparator circuit including the voltmeter MET via a smoothing circuit.

On the other hand, a constant a.c. voltage (which may be the output voltage from the voltage stabilizer circuit AVR) is applied through the terminals $t3$, $t4$ to the rectifier circuit S2 which rectifies the applied a.c. voltage into a d.c. voltage. The rectified voltage is then sent to the comparator circuit through another smoothing circuit, and the voltage created across the resistor R1 by the above described coil current $i$ is compared in the comparator circuit with the calibration voltage obtained from the resistors R6, R7. That is, the difference of the above described two voltages which corresponds to the load F applied on the magnetic core is indicated in the voltmeter MET. In this case, the voltage corresponding to the previously applied prestress can be compensated for by the resistor R6, and the sensitivity of the meter MET can be adjusted by the resistor R4.

Figure 3:
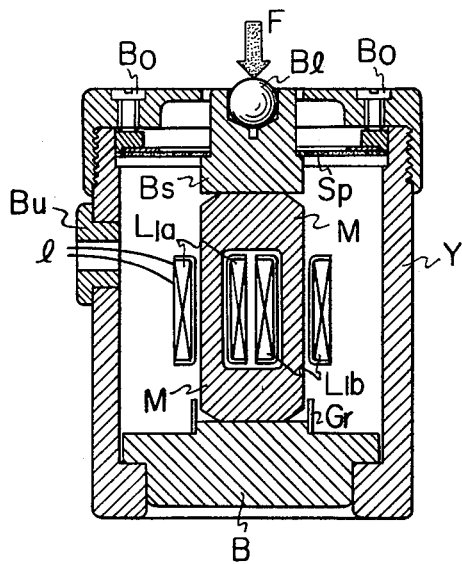
FIG. 3 and 4 are respectively a plan view and an elevational view, in section, showing an example of construction of a transducer element employed in this embodiment of the invention.
Figure 4:
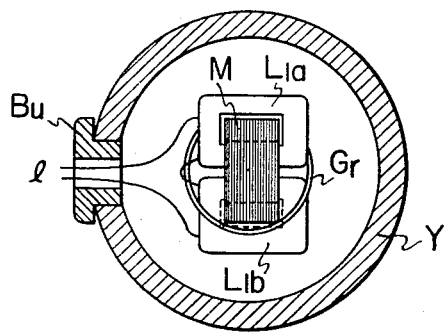

FIGS. 3 and 4 are a profile and a plan view, in section, showing the construction of the detecting element comprising a magnetic core M and coils L1a, L1b similar to the above described embodiment of the present invention. In the drawings, there are also indicated an outside cylindrical frame Y enclosing the transducer element and having a fitting B$u$ for passing lead wires connected to the coils L1a and L1b, a stainless steel ball B1 for receiving the load F, a seat B$s$ for supporting the ball B1, a spring S$p$ which removes the influence of the horizontal component of the load F and also applies a prestress on the magnetic core M, a plurality of screws B$o$ employed for adjusting the prestress for the magnetic core, and a guide ring G$r$ employed for centering the magnetic core M on the bottom plate B of the frame Y.

Figure 5:
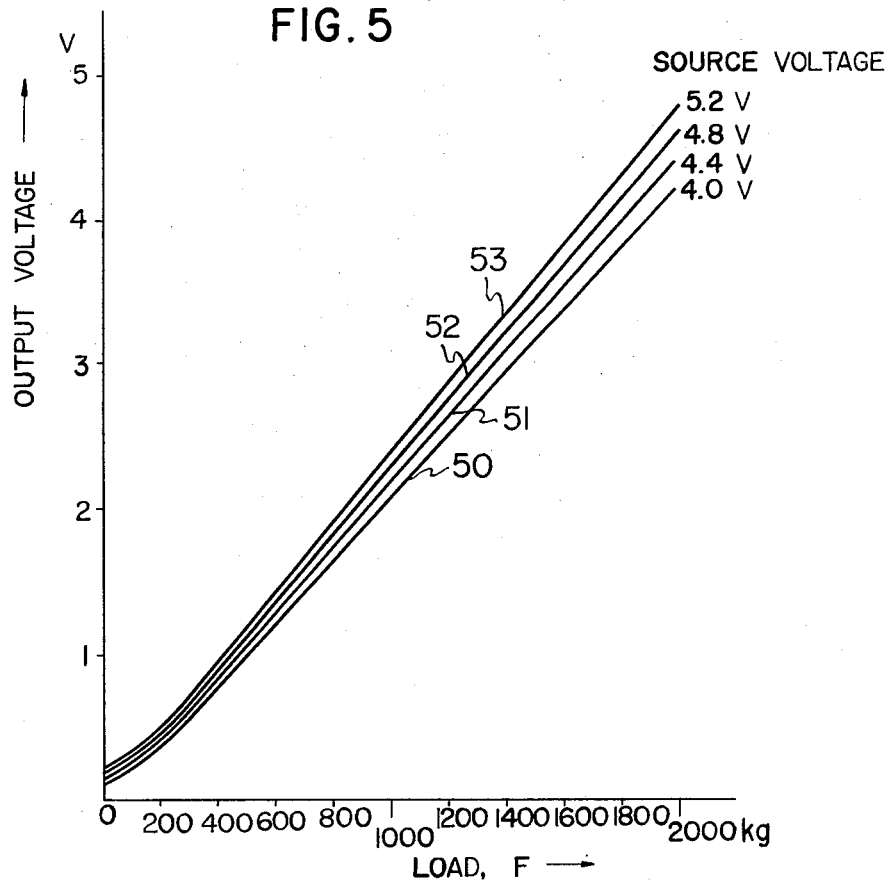
FIG. 5 is a graphical representation indicating the load versus output voltage characteristic of the example of the transducer system.

FIG. 5 is a graphical representation of the test result of the first embodiment of the present invention shown in FIGS. 1 through 4. In FIG. 5, curves 50, 51, 52, and 53 correspond to the characteristics of the transducer element at the time a single phase a.c. constant voltage of 100V, 60 c.p.s., was applied to the terminals $t1$, $t2$, and the secondary voltage of the input transformer T$i$ was adjusted to 4.0, 4.4, 4.8, and 5.2 volts, respectively. It should be noted that the resistors R2 to R7, a capacitor C2, a rectifier circuit S2 were omitted in the above test, and the compensating voltage for application across the terminals $t3$, $t4$ was not employed.

As is clearly seen from this graphical representation, the curves are bent at the portion near the point corresponding to a load of 250 kg, and all of the curves do not start from the zero point. However, it should be understood that such disadvantages can be easily eliminated, of course, by the application of a prestress and the compensating voltage across the terminals $t3$, $t4$. In the above described test, furthermore the number of turns of the coils L1a, L1b was 160 turns, and the turn ratio between the primary and secondary windings of the output transformer T$o$ was 1 : 30, the resistance value of the resistor R1 being 200 ohms. The magnetic core M was constructed from 3 percent silicon steel sheets of 40 × 18 mm size and 0.35 mm thickness, from which a window of 20 × 10 mm was punched out, the sheets being laminated to a thickness of 20 mm.

Figure 6:
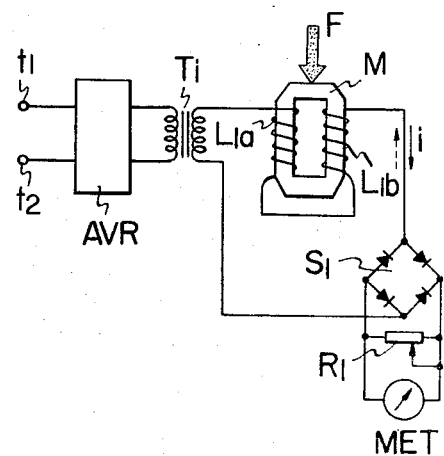
FIG. 6 is a circuit diagram showing a second embodiment of the present invention.

FIG. 6 is an electric circuit diagram showing the second embodiment of the present invention. Along with an increase in the load F, the size of the magnetic core is made larger, and in contrast to the first embodiment of the invention wherein a sufficient number of turns could not be wound for the coils L1a, L1b, a considerable number of turns may be employed in this second embodiment. The magnitude of the load F can be determined by reading the magnitude of the current flowing through a resistor R1, that is, the voltage across the resistor R1 which is connected to the d.c. side of a rectifier circuit S1. Differing from the first embodiment of the invention in which an ordinary table type ammeter is employed for measuring the current $i$, the second embodiment is so composed that an ammeter of low internal resistance can be employed for measuring the current $i$.

Figure 7:
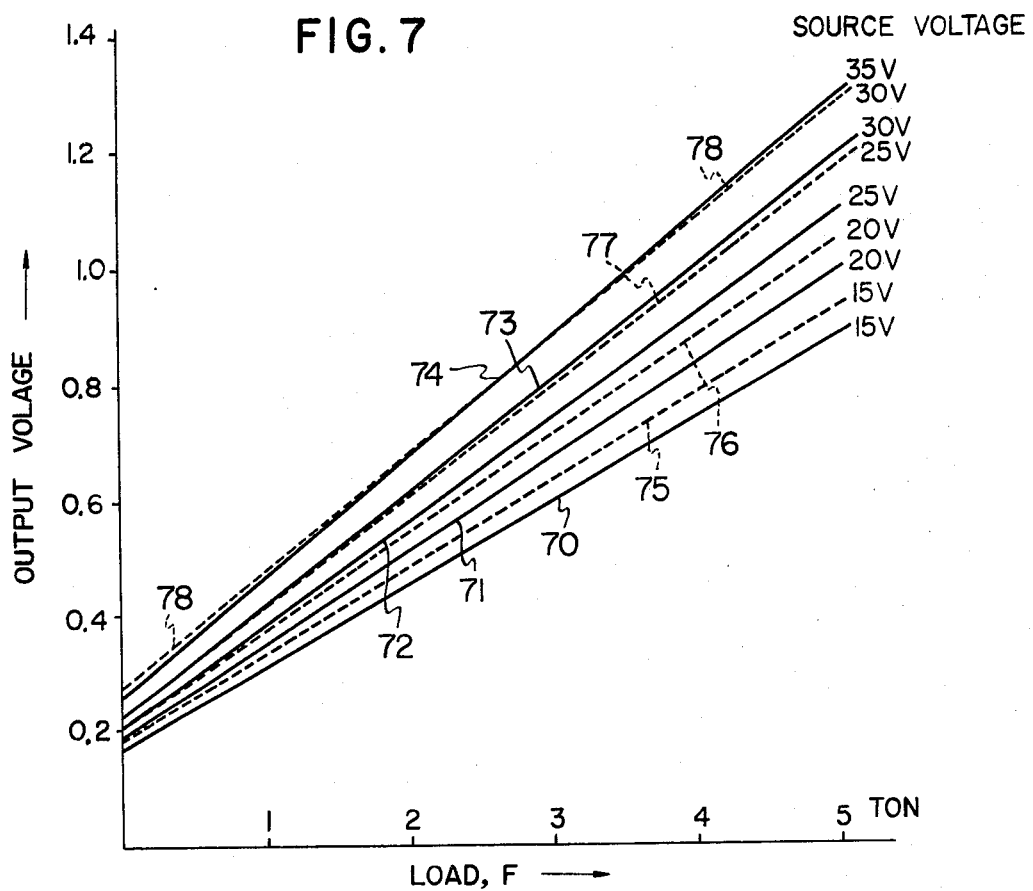
FIG. 7 is a graphical representation indicating the load versus output voltage characteristic of the second embodiment of the invention.

Test data of the transducer system constituting the second embodiment of this invention are indicated in FIG. 7. The curves indicated by full lines from 70 to 74 and broken lines from 75 to 78 correspond to the characteristic curves at the time the secondary voltages of the input transformer T$i$, which is taken as parameters and indicated as "source voltages," have frequencies of 60 and 50 c.p.s. respectively, and their values are as indicated at the upper right portion of the drawing. The test was carried out under a prestress of 1.2 tons on the magnetic core and at a temperature of 22°C. The magnetic core M was fabricated from 3 percent silicon steel sheets of 0.35 mm thickness punched into pieces of 80 × 36 mm size having a 32 × 14 mm window and laminated to 37 mm thickness. The coils L1a, L1b were wound from a 0.6 mm diameter copper wire into 200 turns, and the resistor R1 was selected at 2 ohms.

Although the test data were indicated for a region below 5 tons, it was found that the transducer system showed no recognizable variation up to a load of 10 tons, and when a load of more than 15 tons was applied, variation in its sensitivity and also in the zero point was detected. However, the transducer element itself was not broken by a load of up to 20 tons. As minor modifications of the second embodiment, the resistor R1 may be eliminated, and a d.c. ammeter may be employed directly, or the variation of the current $i$ may be detected by eliminating the rectifying circuit S1 and the voltmeter Met and directly connecting a voltmeter to the circuit passing the current $i$.

Figure 8:
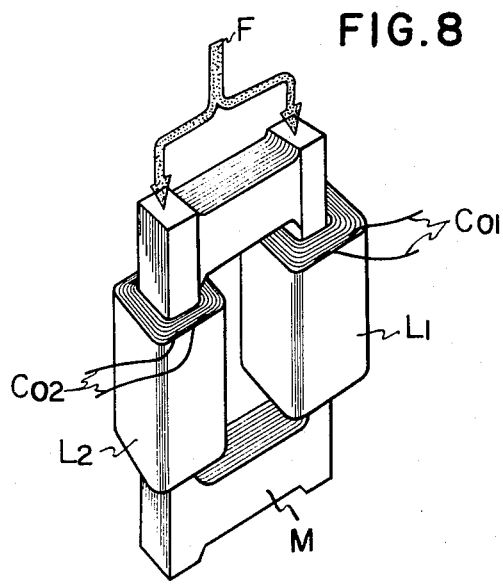
FIG. 8 is a perspective view showing the essential parts of a third embodiment of the invention.

In the third embodiment of the present invention as illustrated in FIG. 8, the transducer element comprises a magnetic core M made of laminated steel sheets formed into a closed magnetic path and coils L1, L2 wound around the magnetic core and connected to leadout wires Co1, Co2. A load F is applied on the transducer element.

Figure 9:
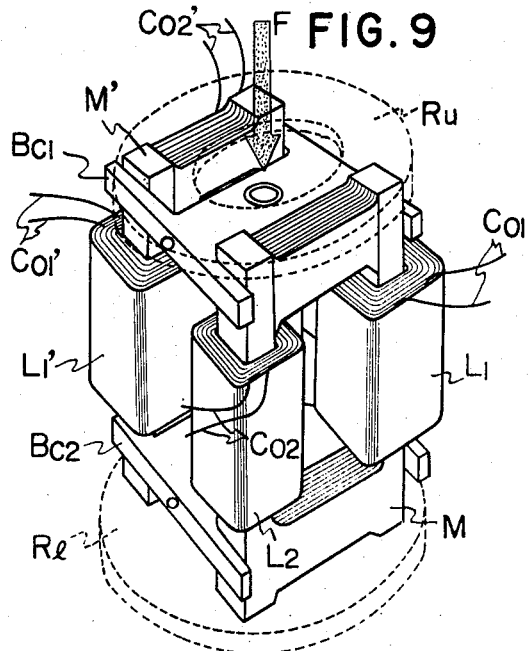
FIG. 9 is a perspective view showing the essential parts of a fourth embodiment of the invention.

In the fourth embodiment of the present invention as illustrated in FIG. 9, another combination of a magnetic core M' and coils L1' and L2' (only L1' is shown in FIG. 9) which is identical to that in the third example is provided in addition to the combination of core M. The leadout wires Co1' and Co2' for the coils L1' and L2' are connected in parallel with the leadout wires Co1 and Co2, respectively, and the magnetic core M' is also combined together with the magnetic core M so that the operation thereof is mechanically stabilized, and the load F is doubled. The combined magnetic core is also provided with an upper loading seat Ru, a lower loading seat Rl, and supporting frames Bc1, Bc2 which mechanically combine together the magnetic cores M and M'.

Figure 10:
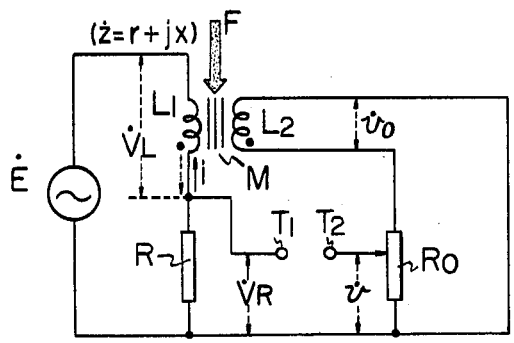
FIG. 10 is a circuit diagram indicating the principle of the third embodiment of the present invention.

FIG. 10 is an explanatory circuit diagram indicating the principle of the third embodiment of this invention the construction of which is illustrated in FIG. 8. With this organization, there is no necessity of providing a dummy element, as described in the specification of U.S. Pat. No. 3,279,247 granted to us, for the purpose of cancelling the initial output or of compensating for it by a prestress for adjusting the zero point, and the transducer element itself can function additionally as the dummy described above. The essential components of the circuit illustrated in FIG. 10 are a constant voltage a.c. power source E, resistors R and Ro, transducer terminals T1, T2, an impedance indicated by $Z = r + jX$ ($r$ is an effective resistance and $X$ is an effective reactance) and, a reactor having and composed of a magnetic core M and the coils L1, L2 at zero load condition with a prestress.

When a voltage V1 is applied across the coil L1, a voltage $V_o$ is induced across the coil L2, a voltage VR is applied across the resistor R, an output voltage v is obtained across Ro, and an exciting current $i$ is passed through the reactor. Variation of the voltage VR corresponding to the voltage drop in the resistor R differs in accordance with the magnitude of the exciting current. As a result, when a rated load is applied to the magnetic core M, the effective resistance $r$ and the reactance $X$ are varied to $r'$ and $X'$, respectively. Thus, if it is assumed that the excitation current $i$ is also changed to $i'$.

$$i = E / (R + r + jX) \quad (4)$$
$$i' = E / (R + r' + jX') \quad (5)$$

where if $R$ and $E$ are selected to satisfy the equation $$X / (R + r) \doteq X' / (R + r') \quad (6)$$

then the phase angle $\theta$ between the current $i$ and the voltage $E$ (tan $\theta \doteq X / (R + r)$) undergoes almost no variation with the variation of the load from zero to the rated value.

Thus, if a voltage corresponding to the reactance component of the voltage VL is maintained substantially constant with respect to the variation of the load F, the terminal voltage vo in the practical use of the secondary coil L2 will be somewhat decreased along with the increase of the load F. The reason for this is that the leakage magnetic flux in the reactor is increased depending on the increase of the load F, and the magnetic flux interlinking with the secondary coil L2 is thereby somewhat decreased. The amount of reduction of the flux in this case depends on the construction of the reactor and on the voltage applied across the primary coil L1 (or the exciting current).

Figure 11:
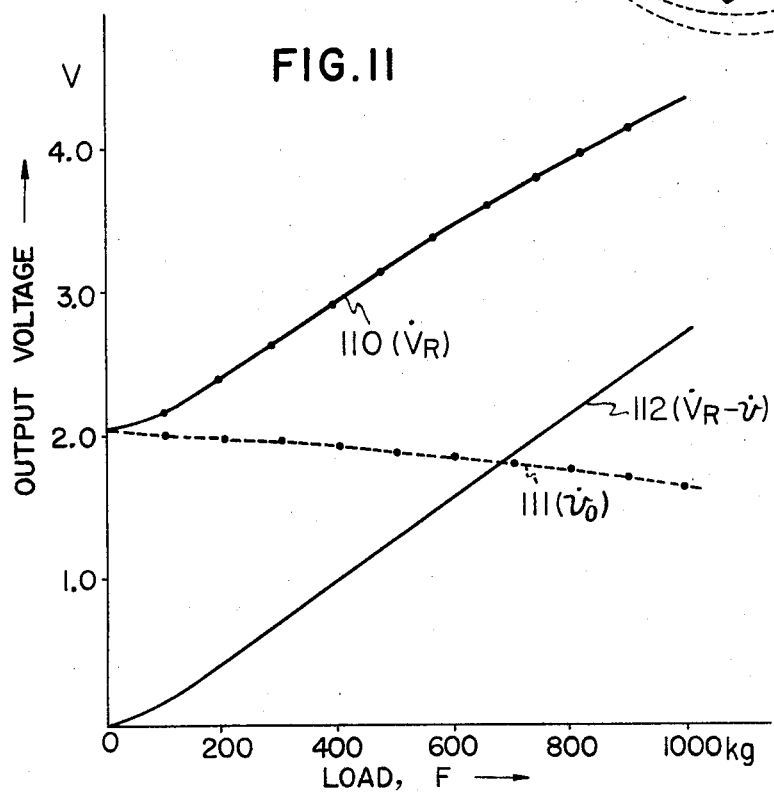
FIG. 11 is an analytical diagram of the load versus output voltage of the same embodiment.

This phenomenon is advantageously utilized for the purpose of improving the linearity of the load versus output voltage characteristic. More specifically, the voltage appearing across the resistor R due to the current passing through the primary coil L1 of the reactor has a tendency to become saturated as indicated in FIG. 11 with increase in the load F. However, the voltage $v$ induced in the secondary coil L2 also has a tendency of being decreased with increase in the load F, and the above mentioned tendency for saturation in the voltage VR can be thereby compensated for in order to improve the linearity of the load/output voltage characteristic.

FIG. 11 indicates an example of the measured data employing the transducer system of the above described embodiment, wherein the curve 110 represents the voltage Vr, the curve 111 represents the voltage Vo, and the curve 112 represents the voltage $Vr - v$ across the terminals T1 and T2.

The transducer system according to this embodiment of the invention comprises a magnetic core M consisting of 3 percent silicon steel sheets of 0.3 mm thickness, 21 sheets of which sheets are laminated into 55 × 23 × 8 mm size having a window of 35 × 13 × 8 mm size formed by punching, and coils L1, L2 for which a copper wire of 0.23 mm diameter is wound into 650 turns and 160 turns, respectively. The power source voltage $E$ is selected at 10 volts, 50 c.p.s., and the resistor R is selected at 10 ohms.

As is apparent from FIG. 11, the voltage $Vr - v$ which represents the load/output characteristic of this embodiment is linear in a range from 150 to 1,000 kg. or more (by the hereinafter described experiment, it was found that the system has good linearity up to more than 1,800 kg. which was the load just before the magnetic core yielded mechanically). The conventional magnetic core of this type has been used for measuring a load of 100 kg. or less, the linear range thereof being from 100 to 250 kg., and employed under a prestress of 100 kg. When the present embodiment of the invention is compared with a conventional example, the superiority of the former will be apparent.

Figure 12:
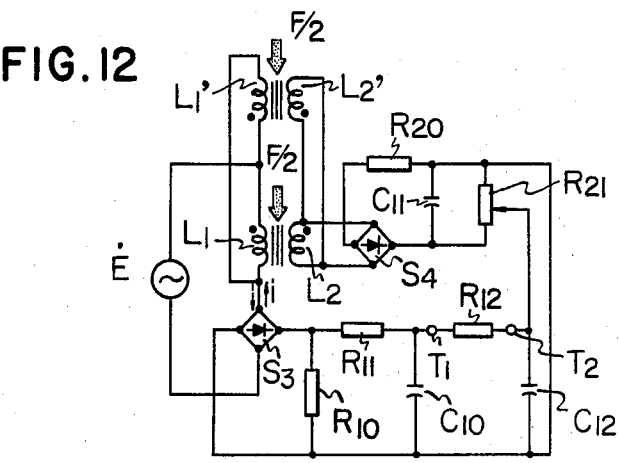
FIG. 12 is a circuit diagram of a transducer system constituting the third embodiment of the present invention.

In the fourth embodiment of the present invention as shown in FIG. 9 with a circuit as shown in FIG. 12, the load F is halved, and one half of the load F is applied to each of the magnetic cores M and M'. The circuit includes rectifier circuits S3 and S4, R10, R11, R12, R20, and R21 and capacitors C10, C11.

Figure 13:
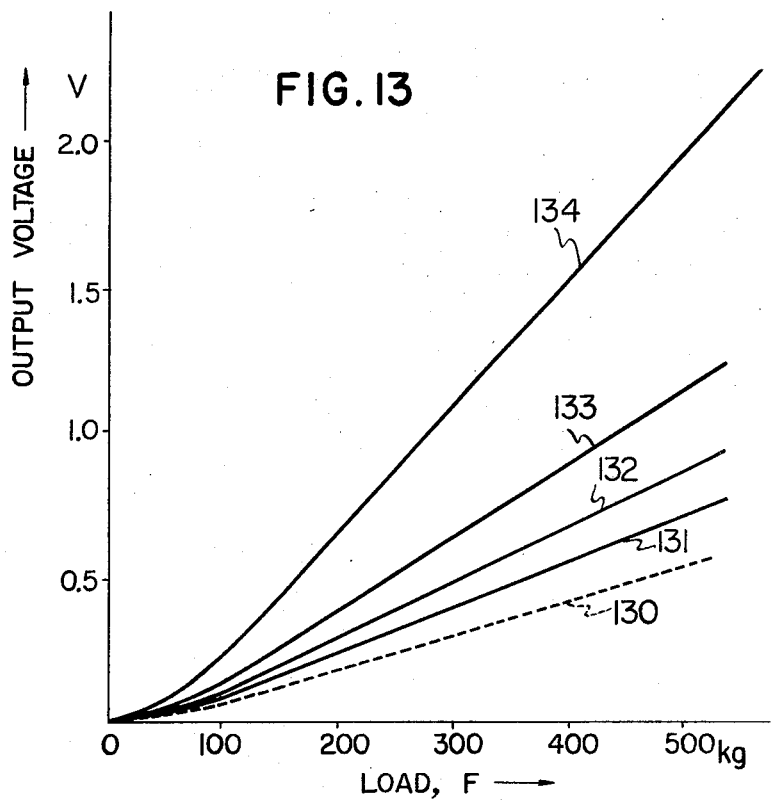
FIG. 13 through 16, and 18 are graphical representations indicating load versus output voltage characteristics of the third and fourth embodiments of the invention.

The characteristic curves of the fourth embodiment shifted by the variation of the resistor R12 are indicated in FIG. 13. The fourth embodiment shown in FIG. 9 employs two magnetic cores M, M' each of which is similar to the magnetic core M shown in FIG. 8. Coils L1, L1' and L2, L2' shown in FIG. 9 have 1,300 turns and 650 turns, respectively. The rectifier circuits S3, S4 shown in FIG. 12 are full wave rectifier bridges consisting of silicon diodes, and the values of the resistors are selected as follows:

R10 = 25 ohms; R11 = 300 ohms; R20 = 300 ohms; and R21 = 1 kilo-ohms. The resistor R21 is so adjusted that it will cancel the terminal voltage of 2.518 volts which is produced across the resistor R10 under no-load condition. The capacitances of M capacitors are selected as follows:

C10 = 200 uF; C12 = 10 uF, and C11 = 200 uF. The power source voltage $E$ is selected at 20 volts, 50 c.p.s.

The curves 131, 132, and 133 correspond to the cases where the resistor R12 is 333, 500, and 1,000 ohms, respectively, with the rest of the components maintained as described above. The curves 130 and 134 correspond to other cases wherein the resistor R12 is kept at 1,000 ohms, and the resistor R10 is 10 ohms and 50 ohms, respectively. As is apparent from FIG. 13, the distortion of the characteristic curves for this example employing two magnetic cores M, M' is less than 0.5 percent in a range of the load F from 200 to 500 kg., and deviation between the characteristic curves for the increasing load and those for the decreasing load (so-called hysteresis effect) is not observable.

Figure 14:
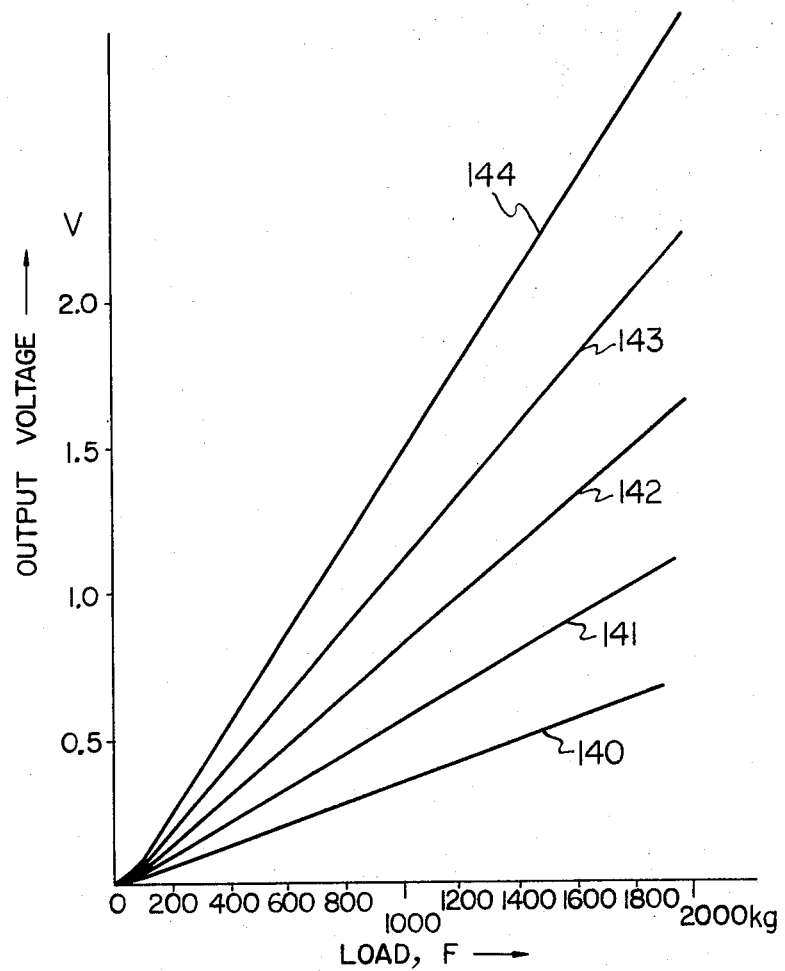

FIG. 14 is another graphical representation of the fourth embodiment of the invention which includes an electric circuit as shown in FIG. 12, wherein the resistor R10 is maintained at 10 ohms, and the value of the detecting resistor R12 is taken as a parameter. More particularly, the curves 140, 141, 142, 143, and 144 correspond to the cases where the resistor R12 is 100, 200, 400, and 1,000 ohms, respectively. It is seen that the distortions from the linearity of all of the curves is less than 1 percent within a range of from 200 to 1,800 kg. of the load, and the hysteresis deviations thereof are also negligible.

Figure 15:
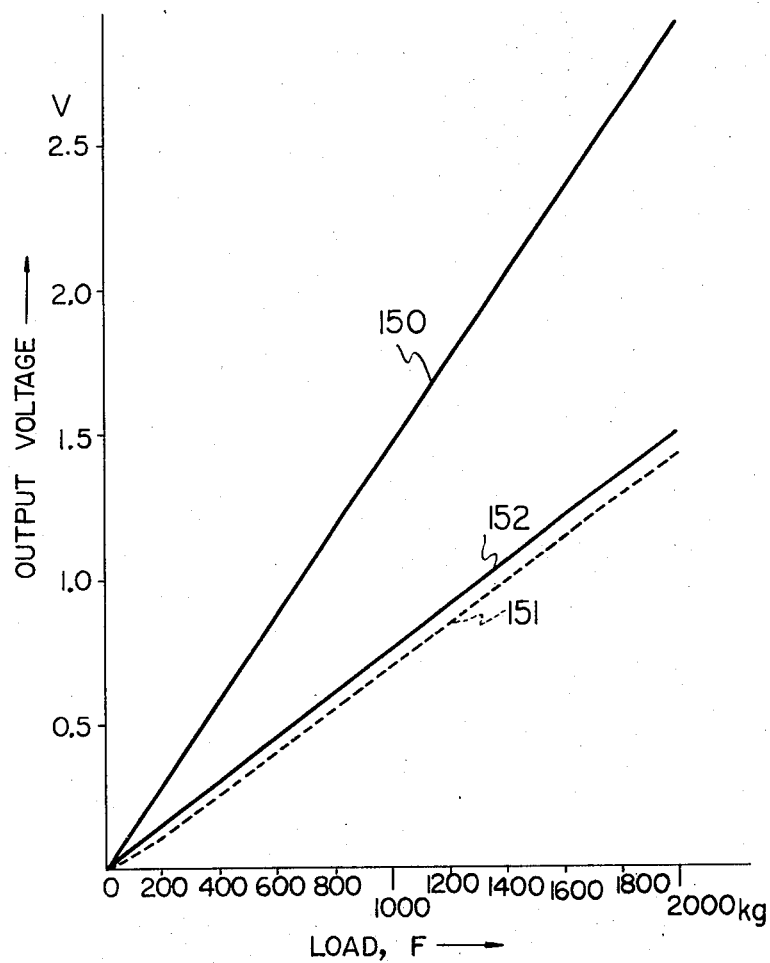

FIG. 15 is still another graphical representation which is employed for the comparison of two cases where merely one magnetic core and two of the magnetic cores are employed together with the circuit as shown in FIG. 12. In the circuit, the values of the resistors are:

R10 = 10 ohms; R11 = 300 ohms; R20 = 0 ohm; and R21 = 5 ohms. The values of the capacitors are:

C10 = 200 uF; C12 = 10 uF; and C11 is not connected. Also in these cases, the power source voltage $E$ is 21.2 volts, 50 c.p.s. Thus, the case where only the first magnetic core is employed is represented by the curve 151; the case where only the second magnetic core is employed is represented by the curve 152; and the case where both of the magnetic cores are employed is represented by the curve 150. From these curves, it is seen that the distortion from linearity within a load range of from 200 to 1,800 kg. is 1.1 percent for the curve 151, 1.6 percent for the curve 152, and 0.5 percent for the curve 150. These results clearly shows that the employment of the two magnetic cores produces better characteristics than the employment of two magnetic cores individually.

Figure 16:
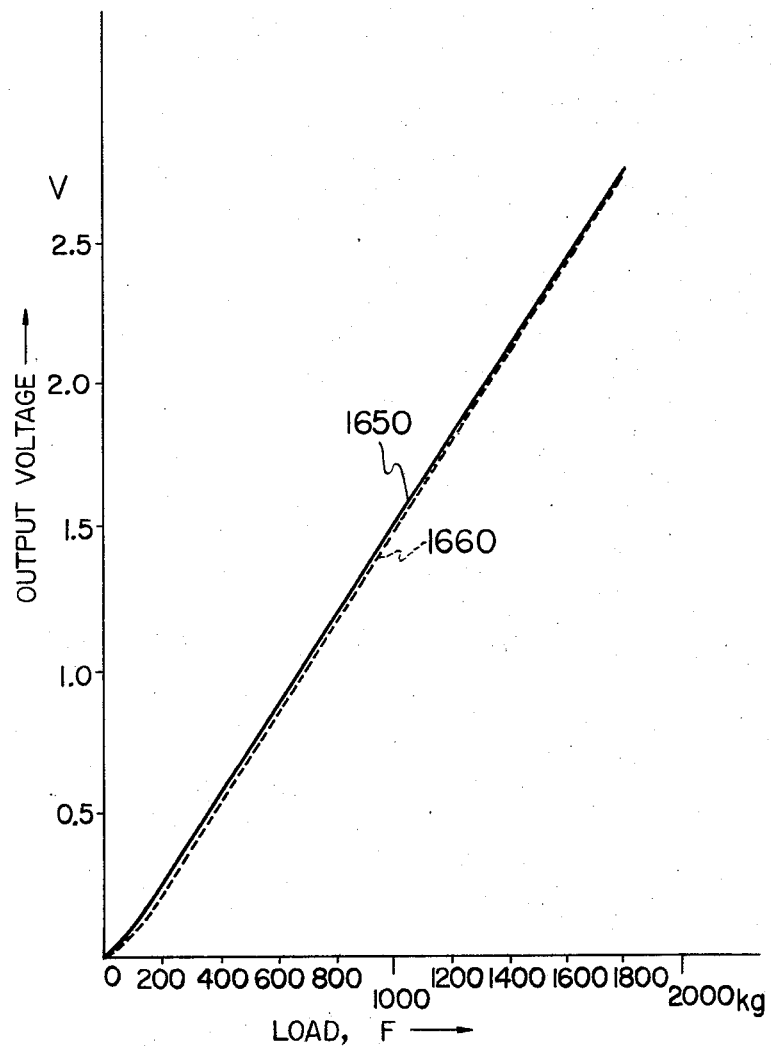

The differences in the characteristic curves corresponding to the cases where 50 and 60 c.p.s. are employed for the power source voltage $E$ are shown in FIG. 16. In these cases, the components in the circuit shown in FIG. 12 are so selected that the resistance R10 is 10 ohms, resistance R12 is infinitive, power source voltage $E$ is 21.2 volts, and all of the other circuit components are maintained the same as described before. Under these conditions, the curve 1,650 corresponds to the case where the power source voltage $E$ is of a frequency of 50 c.p.s., and the curve 1,660 corresponds to the case where the frequency of the power source voltage $E$ is 60 c.p.s. Also, the distortion from linearity of the former case under a load in a range of from 200 to 1,600 kg was 0.5 percent, and that for the latter case under a load in a range of from 200 to 1,400 kg was also 0.5 percent. As is apparent from these results, this embodiment of the invention can be employed for both of the frequencies in the power source voltage $E$ by merely adjusting the resistors R10 and R21.

Figure 17:
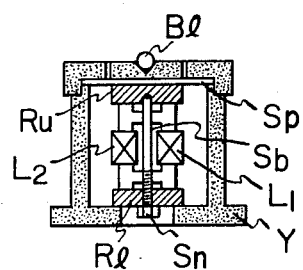
FIG. 17 is a sectional view of a transducer element wherein an outside casing is provide to envelope the transducer element.

FIG. 17 shows schematically and in section another example of the transducer element wherein the transducer element as shown in FIG. 3 or in FIG. 4 is enveloped in a directly loadable casing. In this example, Y designates the casing, B$l$ designates a stainless steel ball for loading, S$p$ designates a diaphragm, S$b$ designates a prestress adjusting stud, S$n$ is the nut for the stud S$b$, and L1, L2, R$u$, and R$l$ designate components similar to those thus indicated in FIG. 9.

Figure 18:
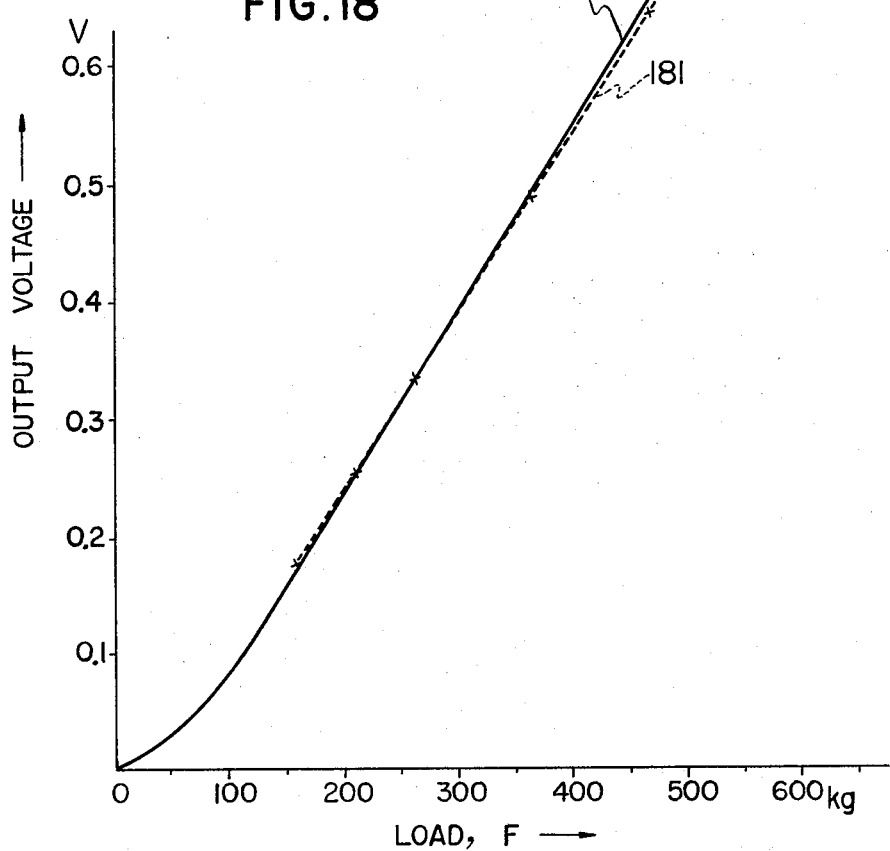

In FIG. 18, curve 180 corresponds to the characteristic of the example shown in FIG. 12 wherein the circuit components are such that the power source voltage $E$ is 20 volts, 50 c.p.s., resistance R10 is 25 ohms, R12 is 333 ohms, and the resistance R10 is adjusted to produce a zero point voltage (initial voltage) of 1,434 volts thereacross. Curve 181 corresponds to the characteristic at the time the same transducer element is enveloped within the casing Y shown in FIG. 17. With the curve 180 compared with the curve 181, it is made apparent that the linearity and non-hysteresis properties of the transducer element are not impaired by the encasement of the transducer element.

A load versus output voltage characteristic curves for the embodiments shown in FIGS. 3 and 4 when the temperature is taken as a parameter are not herein indicated. The reason for this is that merely an error of 0.5 percent at maximum could be detected within a temperature range of 0° to 85°C even by the use of a precision type voltmeter, and, therefore these characteristic curves are intentionally omitted.

Thus, by the employment of the third and fourth embodiments of the present invention, the conventional dummy element and a standard voltage for calibration which are required for compensating the initial output due to the prestress and for adjusting the zero point are allowed to be cancelled because the transducer element itself is capable of functioning as the dummy element, and the loading characteristic and the temperature characteristic of the transducer element cam be remarkably improved.

Furthermore, in the fourth embodiment of the present invention, the rectifying circuits S3, S4 and the smoothing circuit may be eliminated and the resistors R10 and R21 may be inserted in the positions of the circuits S3, S4, whereby the variation of the thus modified current $i$ can be detected by comparing the two voltages.

Summarizing the above description, the conspicuous feature of the present invention is that the linearity of the load versus output voltage characteristic may be extended to near the breaking point of the magnetic core M, that is, approximately 10 times that in the conventional element, by the arrangements of the magnetic core M and the coils L1, L2 in each of the first to fourth embodiments.

We claim:

1. A transducer system for detecting and measuring a mechanical load comprising a magnetic core constructed of laminated sheets of a metal magnetic substance and defining a closed magnetic path having no air gap therein, at least one coil wound around said core, a transformer having input and output terminals, means for connecting the output terminals of said transformer across said coil, a power source of constant a.c. voltage, means for connecting said power source across the input terminals of said transformer, means for establishing the voltage output of said power source at a value causing maximum permeability of said core, a rectifying circuit associated with said coil for producing a d.c. voltage corresponding to the variation of current flowing through said coil, said rectifying circuit having an effective impedance corresponding to no more than one-fifth of the impedance of said coil, when maximum stress is applied to said core, meter means responsive to said d.c. voltage, and means for imparting a prestress mechanically to said core whereby the magnitude of load as applied to said core is determinable from said meter means.

2. A transducer system for detecting and measuring a mechanical load comprising a magnetic core constructed of laminated sheets of a metal magnetic substance and defining a closed magnetic path having no air gap therein, at least one coil wound around said core, an input transformer having input and output terminals, means for connecting the output terminals of said input transformer across said coil, a power source of constant a.c. voltage, means for connecting said power source across the input terminals of said input transformer, means for establishing the voltage output of said power source at a value causing maximum permeability of said core, an output transformer having input and output terminals, means for coupling the input terminals of said output transformer to said coil, to produce at the output terminals thereof a current having variation corresponding to the variation of current through said coil, said output transformer having an impedance at said input terminals corresponding to no more than one-fifth of the impedance of said coils under maximum stress, a rectifying circuit associated with the output terminals of said output transformer and resistance means for producing a d.c. voltage corresponding to the variation of current flowing through said coil.

3. A transducer system as in claim 2, further comprising upper and lower load seat members disposed respectively on and beneath said magnetic core, said seat members being mechanically connected together by stud and nut means for providing and adjusting mechanical prestress imparted to said magnetic core, diaphragm means provided on said upper load seat member and casing means enclosing said magnetic core together with said upper and lower load seat members and said diaphragm means and having at its upper central part a steel ball, said steel ball being engageable with the load to be detected and measured.

4. A transducer system as in claim 2, in which said magnetic core consists of two members aligned in a symmetrical manner and fixed by means of two supporting frames, common upper and lower seat members disposed respectively on and beneath said two core members, said seat members being mechanically connected together by stud and nut means for providing and adjusting mechanical prestress imparted to said magnetic core members, diaphragm means provided on said upper seat member, and casing means enclosing said magnetic core members together with said seat members and diaphragm means and having at its upper central part a steel ball, said steel ball being engageable with the load to be detected and measured.

5. A transducer system for detecting and measuring a mechanical load comprising a magnetic reactor including a magnetic core constructed of laminated sheets of metal magnetic substance and defining a closed magnetic path having no air gap therein, and a primary coil and a secondary coil wound around said core, a power source of constant a.c. voltage, means for connecting said primary coil across said power source, first resistance means connected in series circuit between said power source and said primary coil for providing a first voltage signal proportional to the variation of current flowing through said primary coil, said power source and said first resistance means being characterized that when the effective impedance $Z$ of said reactor is represented as:

$$Z = r + X \quad (1)$$

where $r$ is the real resistance and $X$ is the reactance of said reactor when no load is impressed on said magnetic core, the following equation is established:

$$X/(R+r) = X^1/(R+r^1) \quad (2)$$

where $r^1$ is the real resistance and $X^1$ is the reactance of said reactor when a load is impressed on said magnetic core and $R$ represents the resistance of said first resistance means, second resistance means associated with said secondary coil for providing a second voltage signal proportional to the voltage induced in said secondary coil, means associated with said first and second resistance means for producing a difference voltage signal proportional to a difference between said first and second voltage signals, and means for imparting a prestress mechanically to said core whereby the magnitude of said load is determinable from said difference voltage signal.

6. A transducer system as in claim 5, in which said magnetic core consists of two members which are aligned in a symmetrical manner and fixed by means of two supporting frames, common upper and lower seat members disposed respectively on and beneath said two core members, said seat members being mechanically connected together by stud and nut means for providing and adjusting mechanical prestress imparted to said magnetic core members, diaphragm means provided on said upper seat member, and casing means enclosing said magnetic core members together with said seat members and diaphragm means and having at its upper central part a steel ball, said steel ball being engageable with the load to be detected and measured.

7. A transducer system for detecting and measuring a mechanical load comprising a magnetic reactor including a plurality of magnetic cores, each of said cores being constructed of laminated sheets of metal magnetic substance and defining a closed magnetic path having no air gap therein, and primary coils and secondary coils wound around said cores, said cores being constructed to receive parts of said load to be measured, a power source of constant a.c. voltage, means for connecting said primary coils across said power source, a first rectifying circuit connected in series with said primary coils for producing across first output terminals a first d.c. voltage signal proportional to the variation of current flowing through said primary coils, a first resistance means connected across said first output terminals, said power source and said first resistance means being characterized that when the effective impedance Z of said reactor is represented as:

$$Z = r + X \quad (1)$$

where $r$ is the real resistance and $X$ is the reactance of said reactor when no load is impressed on said magnetic core, the following equation is established:

$$X/(R+r) = X^1/(R+r^1) \quad (2)$$

where $r^1$ is the real resistance and $X^1$ is the reactance of said reactor when a load is impressed on said magnetic core and $R$ represents the resistance of said first resistance means, a second rectifying circuit connected across said secondary windings for producing across second output terminals a second d.c. voltage signal proportional to the variation of current flowing through said secondary coils, a second resistance means connected across said second output terminals, means associated with said first and second resistance means for producing a difference voltage signal proportional to a difference between said first and second d.c. voltage signal, and means for imparting a prestress mechanically to said cores whereby the magnitude of said load is determinable from said difference voltage signal.

8. A transducer system for detecting and measuring a mechanical load comprising a magnetic reactor including a plurality of magnetic cores, each of said cores constructed of laminated sheets of a metal magnetic substance and defining a closed magnetic path having no air gap therein, and primary coils and secondary coils wound around said cores, said cores being constructed to receive parts of said load to be measured, a power source of a.c. voltage, means for connecting said primary coils across said power source, first resistance means associated with said primary coils for producing a first voltage signal proportional to the variation of current flowing through said primary coils, said power source and said first resistance means being characterized that when the effective impedance Z of said reactor is represented as:

$$Z = r + X \quad (1)$$

where $r$ is the real resistance and $X$ is the reactance of said reactor when no load is impressed on said magnetic core, the following equation is established:

$$X/(R+r) = X^1/(R+r^1) \quad (2)$$

where $r^1$ is the real resistance and $X^1$ is the reactance of said reactor when a load is impressed on said magnetic core and $R$ represents the resistance of said first resistance means, second resistance means associated with said secondary coils for producing a second voltage signal proportional to the variation of current induced in said secondary coils, means associated with said first and second resistance means for producing a difference voltage signal proportional to a difference between said first and second voltage signals, and means for imparting prestress mechanically to said cores whereby the magnitude of said load is determinable from said difference voltage signal.

* * * * *